Oct. 27, 1953    J. GLASS, JR., ET AL    2,656,746
PLIERS FOR SPLIT SHOT
Filed Feb. 23, 1949
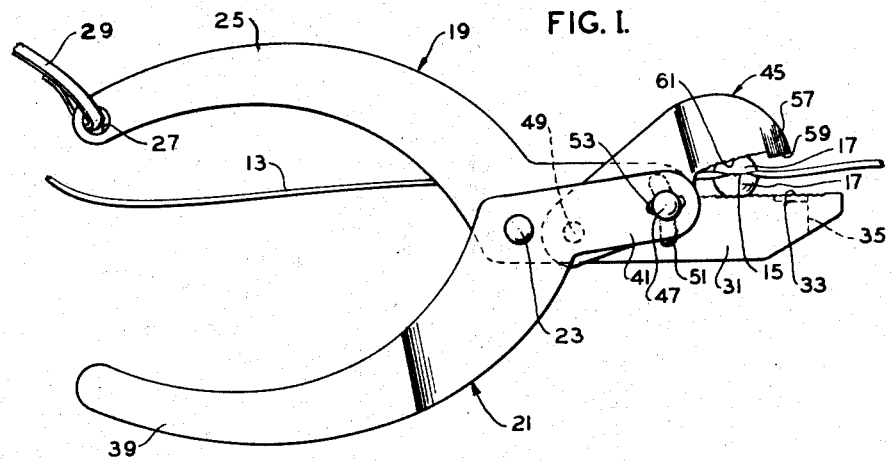
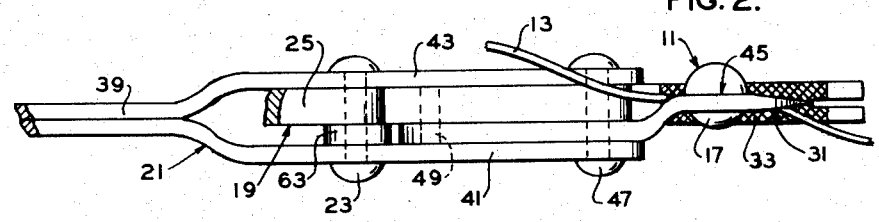
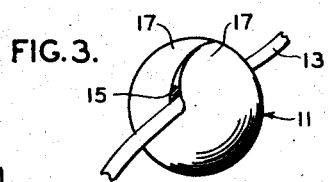
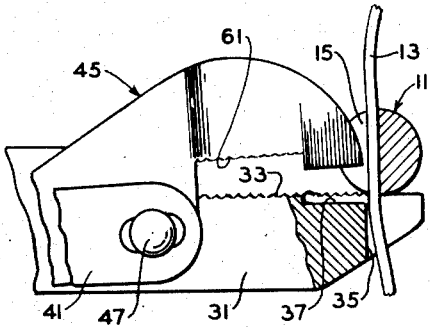
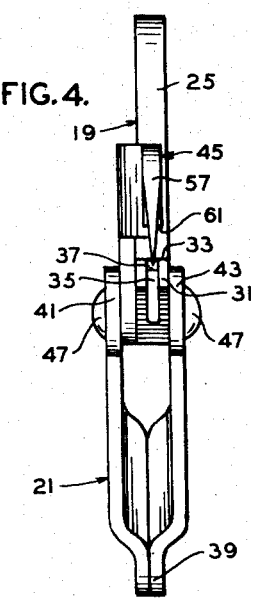
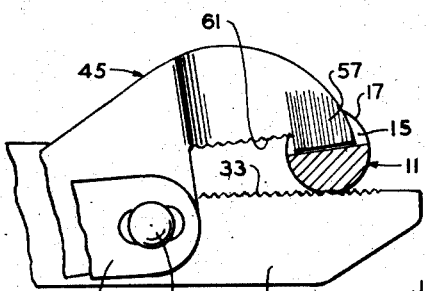
*INVENTOR.*
JOHN GLASS, JR.
ROBERT J. HEATH.
CHARLES F. WOLLER.
BY
ATTORNEY Patented Oct. 27, 1953

UNITED STATES PATENT OFFICE 2,656,746

PLIERS FOR SPLIT SHOT

John Glass, Jr., New York, N. Y., and Robert J. Heath and Charles F. Woller, Muskegon, Mich.

Application February 23, 1949, Serial No. 77,964

3 Claims. (Cl. 81—15)

1

This invention relates to fishermen's tools, and more particularly to a tool of the pliers type, which is used to attach a "split shot" sinker to a fish line or the like, and also to remove such a sinker from a line without injury to either the sinker or the line. Although this is the specific purpose of the tool illustrated in the drawing and described in detail hereinafter, it will be understood that the present invention is not to be considered as limited thereto.

Fishermen use weights or sinkers of various types. One type, having a number of advantages, is known as a "split shot" or "clamp-on" sinker. It is a sphere of lead having a diametrical split half way through it. To secure such a weight or sinker to a fish line, leader, net, etc., it is merely necessary to slip it over a line and press the two halves or lips together to grip the line therebetween. These sinkers are manufactured in several sizes and one or more may be used to obtain a desired amount of weight.

In the past there has been no convenient means for clamping such a split shot to grip a line or spreading it to detach it from a line. Any tool in the fisherman's kit, as a knife or screwdriver, was used for spreading, and a stone, shoe or the like might be used to press the lips together. This haphazard use of these excellent sinkers was further aggravated by the fact that a fisherman's hands were usually wet, cold or slippery which, as often as not, resulted in cut or bashed fingers. Hence, a tool to facilitate the use of these sinkers, particularly under adverse fishing conditions, is most welcome to fishermen.

One object of the present invention is to provide a device which will spread the lips of a "split shot" sinker sufficiently to allow it to be threaded on a fish line.

Another object is to provide such a tool which will clamp a "split shot" sinker so as to urge its two lips toward each other and thereby cause it to grip a fish line positioned therebetween, without damaging said sinker or line.

Another object is to provide such a device which will readily pry apart the lips of such a sinker, when it is secured to a line, so that said sinker may be removed from the line without damaging either said sinker or said line.

Another object is to provide such a tool which includes a relatively sharp edged wedge-like blade and a jaw opposing it, and also suitable means to limit the movement of said blade, so as to protect its sharp edge from being dulled by contact with said jaw.

Another object is to provide such a tool wherein, after the sinker is spread, it is loosened from the blade so as to obviate the necessity of prying it from the blade.

2

Still another object is to provide such a tool which preferably may be small and flat (for convenience in storing in pocket or tackle box), but which nevertheless provides accelerated movement of the jaws to enable them to be sufficiently opened, by limited movements of the handles, for practical usefulness, despite the relatively small size of the tool.

Yet another object is to provide such a tool which has a slot to accommodate and guide a fish line so as to allow a "split shot" sinker to be spread for removal from said line without interfering with or damaging said line.

A further object is to provide a device to achieve the foregoing objects which a fisherman can use conveniently and effectively when his hands are slippery or wet or cold, and which is small enough, and preferably flat enough, to be kept in his tackle box or pocket or hung from his clothing.

Still other objects will become apparent from the following description of a preferred embodiment of the present invention.

We accomplish the foregoing objects by a plier-like tool provided with two opposing jaws, the operational movement of at least one of which jaws is accelerated so as to obtain, in a relatively small tool, sufficient spacing between the jaws, in their open positions, to allow the insertion of a "split shot" type of sinker, of any standard size. Said jaws are of different lengths, and the shorter one (which for convenience we will refer to as the "wedge jaw") is provided at its extremity with a wedge-like blade extending toward the longer jaw (which we will call the "slotted jaw"), the latter being provided with a slot at its extremity to accommodate a fish line during the operation of removing a sinker therefrom, and also being provided with a kerf to protect the edge of the blade when the jaws are fully closed.

A preferred embodiment of our invention is shown in the annexed drawing, wherein, Figure 1 is a side elevation of a fisherman's tool embodying the present invention, shown during the step of clamping a "split shot" sinker on a fish line;

Figure 2 is an enlarged fragmentary top view of Figure 1;

Figure 3 is an enlarged perspective view of a "split shot" sinker secured to a line;

Figure 4 is an enlarged right end view of the tool of Figure 1, shown, however, with the sinker _...closed posi-_
_...entary side ele-_
_...f the jaws of the_
_...the step of re-_
_...allow its removal_

...Figure 5, wherein
the operation of
..."hot" preparatory

...the drawing, the
...ularly for use with

...ker
...split
...two

...ion, the
too... position
illustra... although
of course it... venient posi-
tion. The too... es a pair of
crossed handle m... hich are piv-
otally coupled togeth... s of a rivet 23.
The upper handle mem... is made of a flat
elongated piece of meta... includes, at its
rearward end, an upper ha... e 25 which is suit-
ably curved to fit the hand and is pierced by a
hanger hole 27 for a thong 29 by which the tool
may be fastened or hung, as on a fisherman's
belt. At its forward or operating end, said han-
dle member 19 is provided with a lower slotted
jaw 31. Said lower jaw 31 has an upwardly
facing serrated clamping surface 33. The for-
ward extremity of said lower jaw 31 is bifurcated,
being cut by a vertically disposed fish line slot
35. Just back of said slot 35, the clamping sur-
face 33 is cut by a shallow and narrow, hori-
zontally disposed kerf 37.

The lower handle member 21 is preferably
made up of two flat elongated pieces of metal of
similar configuration which, at their rearward
ends, are contiguous and are welded, or otherwise
intimately bonded together, so as to form a uni-
tary lower handle 39, which is curved to fit the
hand. Forward of said lower handle 39 the said
two pieces are offset so as to provide two for-
wardly extending, operating fingers 41, 43 which
are mutually parallel and spaced from each
other. The upper handle member 19 is flanked
by said operating fingers 41, 43 of the lower han-
dle member 21 (as clearly illustrated in Figures
2 and 4).

Also extending between said operating fingers
41, 43 is an upper wedge jaw 45, which is loosely
pivotally coupled to the forward extremities of
the fingers 41, 43 by means of a floating rivet
47, and is also pivotally coupled to the upper
handle member 19 by means of a blind pivot pin
49. Said pin 49, in all operational positions of
our tool, is always positioned between the fingers
41, 43 of the lower handle member 21 and hence
cannot escape from pivot holes in said upper
handle member 19 and the upper jaw 45, through
which it extends. The floating rivet 47 extends
through a circular hole (not shown) in the upper
jaw 45, through an arcuate limit slot 51 in the
upper handle member 19 and through horizon-
tally elongated pivot slots 53 which pierce the
forward ends of the fingers 41, 43 and are in
register. The limit slot 51 describes an arc of
a circle about the axis of the blind pivot pin 49.

The forward portion of the upper jaw 45 is offset slightly so as to bring it directly over the
kerf 37, referred to above, of the lower jaw 31.
The forward extremity of said upper jaw 45 ter-
minates in a wedge-shaped blade 57 which has
a sharp knife edge 59 on its lower end. When
the jaws 31, 45 are in their closed positions, the
said edge 59 of the blade 57 extends down into
the kerf 37, but does not come into physical con-
tact with any part of the lower jaw 31, as down-
ward pivotal movement of the upper jaw 45 is
restricted by the lower end of the arcuate limit
slot 51. This slot 51 confines movement of the
floating rivet 47, which passes through a hole
in the upper jaw 45. Just rearward of the blade
57, the upper jaw 45 has a recessed, downwardly
facing serrated clamping surface 61.

The blind pivot pin 49 is located just forward
of the rivet 23 and the floating rivet 47 is a short
distance forward of said pin 49. The rivet 23 is
fitted with a spacer washer 63 positioned between
the upper handle member 19 and the finger 41.

When using the present device a fisherman
may find it most convenient to hang it from his
belt by a thong 29 through the hanger hole 27,
or he may tie it to his tackle box or to the gun-
wale of his boat.

The operation of our tool is as follows: First—
to spread apart the lips 17, 17 of a split shot
sinker 11 (as shown in Figure 6) to allow a fish
line 13 or the like to be diametrically positioned
in the split 15, the jaws 31, 45 are first opened,
by moving the handles 25, 39 apart. A sinker
11 may then be positioned upon the clamping
surface 33 of the lower jaw 31, just below the
blade 57. The sinker 11 is positioned with its
split 15 facing upwardly (Figure 5) so that, upon
moving the jaws 31, 45 toward each other, the
knife edge 59 of the blade 57 will enter directly
into the split 15 and spread the lips 17, 17 apart
by a wedging action. The sinker 11 may then
be removed from the blade 57 and a fish line 13
may be placed diametrically within the split 15.

Second—to clamp the lips 17, 17 of a split
shot 11 together to secure it to a fish line 13
placed between said lips (as shown in Figures
1, 2 and 3), the sinker, with the fish line in
the split 15, is placed between the upper and
lower clamping surfaces 61, 33. The split 15
should be horizontally disposed (as in Figure
1) and the sinker 11 should be set to one side
(as in Figure 2) so that the clamping surfaces
61, 33, respectively, contact the lips 17, 17. Mov-
ing the jaws 31, 45 toward each other will then
press the lips 17, 17 together to securely grip
the line 13 therebetween.

Third—to reopen a split shot sinker 11 to
remove it from a fish line 13, said sinker and
line are positioned (as shown in Figure 5) in
our tool so that the line is vertically disposed
and extends through the line slot 35 and the
split 15 is vertically positioned and faces rear-
wardly toward the handles 25, 39. When the
handles are pressed toward each other, the outer
corner of the blade 57 will enter one end of
the split 15 and will move downwardly through
said split until it is spread apart. The line 13
will not be touched as it will be beyond the ex-
tremity of the blade 57. It should also be noted
that the blade 57 will continue beyond the lower
end of the split 15 and into the kerf 37 suffi-
ciently to allow the sinker 11 to be readily re-
leased from said blade. The line 13 may then
be freed from the sinker 11.

As pointed out above, accelerating the move-
ment of one of the jaws results in a relatively small tool. This accelerated movement is accomplished by having the upper jaw 45 separate from the lower handle member 21 and having said jaw 45 pivotally coupled to both said lower handle member 21 (by the floating rivet 47) and the upper handle member 19 (by the blind pivot pin 49), and having the rivet 47 closer to the pin 49 than to the rivet 23. This causes the jaw 45 to swing through a greater angular distance than the lower handle member 21, by which it is actuated. All of the parts are made of flat metal and hence the cost is kept down and the finished tool is relatively flat so as to fit easily into a pocket or elsewhere.

What we claim is:

1. A plier-like tool of the character described comprising a first handle member including a first handle at its rearward end and a first jaw at its forward end, a second handle member including a second handle at its rearward end and a pair of spaced parallel operating fingers at its forward end, said first handle member passing between said fingers, a fixed rivet passing through said fingers and said first handle member to pivotally couple said handle members together for plier-like operation, a second jaw passing between said fingers, a pivot pin disposed forward of said fixed rivet and between said fingers and passing through said first handle member and said second jaw to pivotally couple said last named member and jaw together, a floating rivet disposed forward of said pivot pin and passing through longitudinally extending slots in the forward ends of said fingers, through said second jaw and through a limit slot in said first handle member to pivotally couple said last mentioned fingers, jaw and member together, said limit slot being of arcuate configuration and described about the axis of said pivot pin, and one end of said limit slot cooperating with said floating rivet to limit movement of said jaws toward each other.

2. In a tool of the character described, first and second jaws, and means to actuate said jaws to opened and closed positions and to prevent their movements beyond said positions, said first jaw including, at its extremity, a wedge-like blade, said second jaw including a substantially longitudinally kerfed clamping surface, the blade and the kerf in the clamping surface being opposingly aligned and the kerf being of sufficient depth so that, when the jaws are in their closed positions, the blade extends into the kerf and is spaced from its base, and the second jaw having an extremity which, when the jaws are in their closed poistions, extends forward beyond the blade and which extremity is provided with a slot extending through said second jaw in the plane of movement of said blade.

3. In a tool for removing a split shot sinker from a line, the combination of a fixed jaw including a clamping surface, a movable jaw including a wedge-shaped blade, means to actuate said movable jaw to move the apex edge of said blade toward said surface and means to guide a line in a direction generally parallel to said movement of said blade and out of the path of said blade, whereby a split shot sinker may be removed from a line by positioning the sinker upon the clamping surface with the line threaded through said line guiding means and moving said blade toward said surface and lengthwise through the split of said sinker and substantially parallel to and spaced from said line, said line guiding means being a slot through the end of the fixed jaw in the plane of movement of the blade, the base of the slot being forward of the edge of the blade and substantially at right angles to the edge of the blade when in its closed position.

JOHN GLASS, JR.
ROBERT J. HEATH.
CHARLES F. WOLLER.

References Cited in the file of this patent

UNITED STATES PATENTS

| Number | Name | Date |
|---|---|---|
| 404,811 | Wichelhaus | June 4, 1889 |
| 456,352 | Boecker | July 21, 1891 |
| 638,468 | McKellops | Dec. 5, 1899 |
| 838,920 | Varnedoe | Dec. 18, 1906 |
| 1,290,331 | Partlow | Jan. 7, 1919 |
| 1,389,584 | Goodridge | Sept. 6, 1921 |
| 1,850,664 | Daniels | Mar. 22, 1932 |
| 1,883,081 | Sturm | Oct. 18, 1932 |
| 1,969,129 | Harz | Aug. 7, 1934 |
| 2,384,822 | Drmic | Sept. 18, 1945 |
| 2,571,819 | Boel et al. | Oct. 16, 1951 |